(12) United States Patent
Hannig et al.

(10) Patent No.: US 11,198,278 B2
(45) Date of Patent: Dec. 14, 2021

(54) MULTI-LAMINATE PLASTIC CARRIER PLATE AND METHOD FOR THE PRODUCTION THEREOF

(71) Applicant: AKZENTA PANEELE + PROFILE GMBH, Kaisersesch (DE)

(72) Inventors: Hans-Jürgen Hannig, Bergisch Gladbach (DE); Felix Hüllenkremer, Koblenz (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 16/649,352

(22) PCT Filed: Aug. 13, 2019

(86) PCT No.: PCT/EP2019/071762
§ 371 (c)(1),
(2) Date: Mar. 20, 2020

(87) PCT Pub. No.: WO2020/035511
PCT Pub. Date: Feb. 20, 2020

(65) Prior Publication Data
US 2020/0215801 A1    Jul. 9, 2020

(30) Foreign Application Priority Data

Aug. 14, 2018    (DE) ............... 10 2018 119 766.7

(51) Int. Cl.
*B32B 7/02*    (2019.01)
*B32B 27/08*    (2006.01)
(Continued)

(52) U.S. Cl.
CPC ............. *B32B 27/08* (2013.01); *B32B 27/20* (2013.01); *B32B 27/36* (2013.01); *B32B 37/02* (2013.01);
(Continued)

(58) Field of Classification Search
CPC ..... B32B 21/06; B32B 21/10; B32B 2250/05; B32B 2250/244; B32B 2250/40;
(Continued)

(56) References Cited

U.S. PATENT DOCUMENTS 3,006,761 A * 10/1961 Maximilian ............. C08J 7/043
430/167
6,888,147 B1    5/2005 Hansson et al.
(Continued)

FOREIGN PATENT DOCUMENTS

EP    2722189 A1    4/2014
EP    2757129 A1    7/2014
(Continued)

OTHER PUBLICATIONS

Office Action regarding Russian Patent Application No. 2020123236 (with English translation), dated Jan. 14, 2021.
(Continued)

*Primary Examiner* — Lawrence D Ferguson
(74) *Attorney, Agent, or Firm* — Harness, Dickey & Pierce, P.L.C.

(57) ABSTRACT

The present disclosure relates to a multi-laminate plastic carrier plate having a plurality N of A-B-A layer sequences, wherein the A layer includes a first thermoplastic resin and the B layer includes a second thermoplastic resin, and wherein the first thermoplastic resin is a virgin plastic and the second plastic is a recycled plastic, and wherein $250 \geq N \geq 2$, preferably $200 \geq N \geq 3$, preferably $125 \geq N \geq 4$, still more preferably $100 \geq N \geq 5$.

6 Claims, 1 Drawing Sheet

Figure 1:
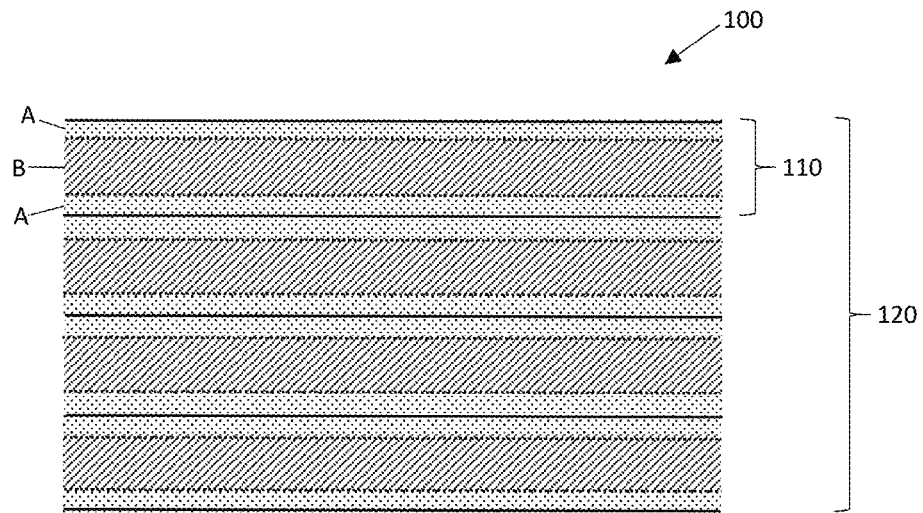

(51) Int. Cl.
    *B32B 27/20*      (2006.01)
    *B32B 27/36*      (2006.01)
    *B32B 37/02*      (2006.01)
    *E04F 13/18*      (2006.01)
    *E04F 15/10*      (2006.01)

(52) U.S. Cl.
    CPC ............ *E04F 13/18* (2013.01); *E04F 15/105* (2013.01); *B32B 2250/05* (2013.01); *B32B 2250/244* (2013.01); *B32B 2250/40* (2013.01); *B32B 2264/04* (2013.01); *B32B 2264/067* (2013.01); *B32B 2264/10* (2013.01); *B32B 2272/00* (2013.01); *B32B 2307/518* (2013.01); *B32B 2307/734* (2013.01); *B32B 2419/04* (2013.01); *B32B 2451/00* (2013.01); *B32B 2607/00* (2013.01)

(58) Field of Classification Search
    CPC ............ B32B 2255/02; B32B 2255/08; B32B 2255/10; B32B 2255/26; B32B 2264/04; B32B 2264/067; B32B 2264/10; B32B 2264/102; B32B 2272/00; B32B 2307/306; B32B 2307/518; B32B 2307/54; B32B 2307/554; B32B 2307/558; B32B 2307/718; B32B 2307/7246; B32B 2307/732; B32B 2307/734; B32B 2419/00; B32B 2419/04; B32B 2451/00; B32B 2607/00; B32B 27/08; B32B 27/10; B32B 27/12; B32B 27/16; B32B 27/20; B32B 27/302; B32B 27/304; B32B 27/32; B32B 27/36; B32B 29/02; B32B 37/02; B32B 3/02; B32B 5/022; B32B 5/26; B32B 7/022; B32B 7/04; B32B 7/12; E04F 13/18; E04F 15/105

See application file for complete search history.

(56) References Cited

U.S. PATENT DOCUMENTS

| | | | | |
|---|---|---|---|---|
| 8,617,673 | B1* | 12/2013 | Desai | B32B 27/36 428/35.7 |
| 9,512,622 | B2 | 12/2016 | Hannig | |
| 10,479,134 | B2 | 11/2019 | Hannig | |
| 2015/0368909 | A1 | 12/2015 | Hannig | |
| 2016/0176167 | A1* | 6/2016 | Shin | B32B 27/08 428/213 |
| 2017/0157977 | A1 | 6/2017 | Hannig | |

FOREIGN PATENT DOCUMENTS

| | | |
|---|---|---|
| EP | 2942208 A1 | 11/2015 |
| EP | 3037276 A1 | 6/2016 |
| EP | 3088204 A1 | 11/2016 |
| KR | 20130078581 A | 7/2013 |
| KR | 20130078584 A1 | 7/2013 |
| KR | 10-2015-0021150 A | 3/2015 |
| WO | 2014029887 A1 | 2/2014 |

OTHER PUBLICATIONS

Office Action regarding Chinese Patent Application No. 202010481005.3, dated Aug. 16, 2021 (no English translation provided).
Office Action regarding Korean Patent Application No. 10-2020-7020250, dated Sep. 10, 2021.

* cited by examiner

MULTI-LAMINATE PLASTIC CARRIER PLATE AND METHOD FOR THE PRODUCTION THEREOF

CROSS-REFERENCE TO RELATED APPLICATIONS

This application is a National Phase of International Application No. PCT/EP2019/071762 filed on Aug. 13, 2019. This application claims the benefit of German Patent Application No. 10 2018 119 766.7, filed on Aug. 14, 2018. The entire disclosures of the above applications are incorporated herein by reference.

FIELD

The present disclosure relates to a multi-laminate plastic carrier plate and a method for production thereof. The present disclosure relates in particular to a multi-laminate plastic carrier plate for producing decorative wall, ceiling and floor panels and a method for producing such decorative panels.

BACKGROUND

This section provides background information related to the present disclosure which is not necessarily prior art.

Decorated panels as such are known, wherein the term wall panel is also understood to include panels which are suitable for cladding ceilings or doors. They typically consist of a carrier or core made from a solid material, for example a wood material, such as a medium density fibreboard (MDF) or high density fibreboard (HDF, a wood-plastic composite (WPC) or a mineral-plastic composite (MPC), at least one side of which is furnished with a decorative layer and a covering layer, and optionally with further layers, for example a wear layer arranged between the decorative and the covering layer. In the case of MDF or HDF supports, the decorative layer is typically applied to a print substrate arranged on the support, which substrate may consist of a paper layer. In this context, it is known to print the decorative layer on the paper layer before the paper layer is applied to the support, or also to apply an initially unprinted paper layer to the support and then to apply the decorative layer to the paper layer by means of direct printing processes. In the case of supports based on plastic composites, it is known to furnish said supports with a decoration after optionally applying a print substrate in a direct printing process.

A disadvantage of the supports based on wood materials is often the only limited resistance to moisture of the resulting decorative panels, with the consequently limited range of uses of such panels. Therefore, in recent years more and more plastic-based supports have been developed in order to extend the field of application of corresponding decorative panels. However, it is precisely in the field of plastic-based supports that there is still development potential by which they might be improved in both ecological and economical terms.

EP2 757 129 A1 discloses a decorative panel which has a board-like substrate which is at least partly made from a thermoplastic composition modified using an elastomer powder. The suggested decorative panel has at least one board-like substrate and a decorative layer arranged thereon, wherein the board-like substrate is at least partly made from a thermoplastic composition which is modified by melt blending with an elastomer powder having at least one thermoplastic material and at least one fine grained, cross-linked and powdery elastomer material incorporated in the matrix material.

WO 2014/029887 A1 discloses a method for producing a decorated wall or floor panel, including the method steps a) providing a board-like support, b) applying a primer at least to the surface of the board-like support which is to be printed, c) applying a decoration by means of printing to at least a part of the surface that was treated with the primer, which is characterized in that a liquid, radiation-curable mixture on a urethane acrylate base is used as the primer.

EP 2 942 208 A1 discloses a method for producing a decorated wall or floor panel, including the method steps: a) providing a free-flowing carrier material, in particular a granulate, b) arranging the carrier material between two belt-like conveying means, c) shaping the carrier material using the action of temperature to form a web-like carrier, d) compressing the carrier, e) treating the support using the action of pressure by means of a dual-band press, wherein the support is cooled in or in front of the dual-band press; f) optionally further cooling the carrier, g) optionally applying a decorative substrate to at least a portion of the carrier; h) applying a decor which simulates a decorative pattern to at least one partial region of the carrier, i) applying a protective layer to at least a portion of the decoration, j) optionally structuring the protective layer for inserting pores and/or the edge region of the carrier for forming connecting elements, and k) optionally treating the carrier for electrostatic discharge before one of the aforementioned method steps.

EP 3 088 204 A1 discloses a method for producing a decorated wall or floor panel, including the method steps: a) providing a free-flowing carrier material, in particular a granulate, b) arranging the carrier material between two belt-like conveying means, c) shaping the carrier material using the action of temperature to form a web-like carrier, d) compressing the carrier, e) treating the support using the action of pressure by means of a dual-band press, wherein the support is cooled in or in front of the dual-band press; f) optionally further cooling the carrier, g) optionally applying a decorative substrate to at least a portion of the carrier; h) applying a decor which simulates a decorative pattern to at least one partial region of the carrier, i) applying a protective layer to at least a portion of the decoration, wherein j) a film made from a moisture-absorbing material is arranged below or above the carrier material before the carrier material is arranged between two belt-like conveying means in accordance with method step b).

SUMMARY

This section provides a general summary of the disclosure, and is not a comprehensive disclosure of its full scope or all of its features It is the object of the present disclosure to suggest an improved plastic-based support material which is suitable in particular for producing decorated wall, ceiling and floor panels.

Preferred variants of the disclosure are described in the subclaims, the description or the figures, wherein further features described or illustrated in the subclaims, the description or the figures in any combination may constitute an object of the disclosure unless the contrary is unequivocally evident from the context. In particular, the quantities and properties of the respective materials and substances indicated in the following text may be combined with each other in any way desired.

With the disclosure, a multi-laminate plastic support material is suggested which contains a plurality N of layer sequences A-B-A, wherein the A layer includes a first thermoplastic resin and the B layer includes a second thermoplastic resin, and wherein the first thermoplastic resin is a virgin resin and the second resin is a recycled resin, and wherein $250 \geq N \geq 2$, preferably $200 \geq N \geq 3$, preferably $125 \geq N \geq 4$, still more preferably $100 \geq N \geq 5$.

Surprisingly, it was demonstrated that a plastic support material of such kind can be used to produce a wall, ceiling or floor panel with improved moisture resistance, in particular with reduced swelling caused by moisture or heat, and with good mechanical properties and improved workability. Moreover, the plastic support material according to the disclosure is ecologically advantageous, as a considerable portion thereof can be manufactured from recycled plastic and it is thus economical in terms of resources.

Within the scope of the disclosure, the term "decorated wall or floor panel" or "decorative panel" is understood to mean in particular wall, ceiling, door or floor panels which have a decoration that simulates a decorative template and has been applied to a support board. In this context, decorative panels are used in a wide range of applications not only in interior design but also for the decorative panelling of structures in trade fair construction, for example. One of the most common areas of utilisation for decorative panels is their use as floor covering. In this context, the decorative panels often include a decoration which is intended to resemble a natural material.

Examples of such imitated natural materials or decorative templates are wood types such as maple, oak, birch, cherry, ash, walnut, chestnut, wenge or also exotic woods such as panga-panga, mahogany, bamboo and bubinga. Natural materials such as stone surfaces or ceramic surfaces are also imitated frequently.

Accordingly, within the scope of the present disclosure the term "decorative template" may be understood in particular to mean an original natural material of such kind, or at least a surface of such, which is to be imitated or simulated by the decoration.

A "free-flowing" material may be understood in particular to describe a material which may be applied to a foundation in a pouring by a pouring operation or a spreading operation. In this context, the material may exist as a fluid or in particular as a free-flowing solid.

In addition, a "granulate" or "granular material" may be understood to describe a solid or a solid aggregate which comprises or consists of a multiplicity of solid particles such as grains or beads. Granular or powdery materials may be cited as examples of these, although the list is not limited thereto.

A "support" may be understood in particular to refer to a completed panel as the core or a layer serving as the base layer, which in particular may contain a natural material such as a wood material, a fibre material or a material that comprises a plastic. For example, the support may already lend the panel a suitable stability or contribute thereto.

Accordingly, a support material may be understood to be such a material that constitutes at least the major part of the support. In particular, the support may consist of the support material.

In this context, a "web-like support" may be understood to refer to a support which for example as a result of its manufacturing process has a length which is web-like and thus considerably larger than its width and thickness, and of which the length may be greater than 15 metres, for example.

Also within the meaning of the present disclosure, in this context a "board-like support" may also be understood to be a support which is formed by separation from the web-like support and is constructed in the shape of a board. The board-like support may also predefine the shape and/or size of the panel that is to be produced. However, the board-like support may also be provided as a large panel. A large panel within the meaning of the disclosure is in particular a support whose dimensions are larger than the dimensions of the eventual decorative panel by a multiple thereof and which is divided into a corresponding plurality of decorative panels during the manufacturing process, for example by sawing, or cutting by laser beam or water jet. The large panel may correspond to the web-like support, for example.

A support material as described previously thus serves in particular for producing a support for a decorated wall or floor panel. The support material essentially includes two materials, wherein within the meaning of the present disclosure a material may be understood to be either a homogeneous material, that is to say a material formed from only a single substance, or also a heterogeneous material, that is to say a material consisting of at least two substances, wherein the material consisting of at least two substances may thus also be understood to be a substance mixture.

According to one variant of the disclosure, layers A and B each have a layer thickness between 100 µm and 2000 µm. In this context, it may be provided that the layer thickness of the A layer is different from the layer thickness of the B layer. Accordingly, it may be provided for example that the B layer has a layer thickness which is equal to $\geq 100\%$ to $\leq 1000\%$ of the layer thickness of the A layer. In a further variant, it may be provided that the layer thickness of the A layer has a layer thickness which is equal to $\geq 100\%$ to $\leq 1000\%$ of the layer thickness of the B layer. In another variant of the disclosure, it may be provided that the layer thickness of the two A layers are different from one another.

According to a further variant of the disclosure, it may be provided that the recycled thermoplastic resin B layer includes an amorphous polyethylene terephthalate (PET). Large quantities of polyethylene terephthalate (PET) are encountered in the packaging industry, where it is used particularly for food packages and beverage bottles. Since the highest standards must be maintained in the domain of food packaging, there is usually only limited scope for recycling PET. Furthermore, despite the recycling processes that are now available, such as the United Resource Recovery Corporation (URRC) process, large quantities of PET are not recycled locally, but instead they are exported for manufacturing synthetic fibres. In this regard too, the process according to the disclosure offers a further option for using recycled PET.

The proportion of recycled polyethylene terephthalate in the B layer may preferably be in a range between $\geq 10$ wt % and $\leq 100$ wt % relative to the polymer content in the B layer. The proportion of recycled polyethylene terephthalate in the B layer may particularly preferably be in a range between $\geq 15$ wt % and $\leq 90$ wt %, $\geq 20$ wt % and $\leq 80$ wt %, in particular relative to the polymer content in the B layer.

Besides the recycled polyethylene terephthalate, virgin polyethylene terephthalate may be provided in the B layer. In this context, the proportion of virgin PET may be in a range between $\geq 0$ wt % and $\leq 90$ wt % relative to the polymer content in the B layer. The proportion of virgin polyethylene terephthalate in the B layer may particularly preferably be in a range between $\geq 10$ wt % and $\leq 80$ wt %, $\geq 15$ wt % and $\leq 75$ wt % in particular relative to the polymer content in the B layer. An improved bond with layers A may be achieved with the provision of virgin PET.

According to a further variant of the disclosure, it may be provided that the B layer contains a filler material besides the thermoplastic resin, wherein the filler material is preferably chosen from the group consisting of chalk, non-asbestos silicate, preferably magnesium silicate, sawdust, expanded clay, volcanic ash, pumice, aerated concrete, in particular inorganic foams, cellulose, or contains an expanding agent.

The proportion of filler material may preferably be in a range between ≥1 wt % and ≤60 wt %, in particular in a range between ≥5 wt % and ≤50 wt % relative to the total weight of the materials that makes up the B layer.

By adding filler materials, it is advantageously possible to adjust the material properties of the multi-laminate plastic support material such as its specific weight, or even its calorific value. The calorific value in particular is significant with regard to the question of the fire load represented by the wall, ceiling or floor covering which is created on the basis of a corresponding multi-laminate plastic support and introduced into the building. In general, the proportions of thermoplastic resin material and filler material may be selectable depending on the intended field of application and the desired properties of a panel produced on the basis of a multi-laminate plastic support material according to the disclosure. In this way, it is possible to assure good adaptability to the desired field of application.

It may be particularly preferably provided that a sheet silicate, such as talcum for example, is used as the filler material in the B layer. In this context, talcum is understood to refer in known manner to a magnesium silicate hydrate, which may have the molecular formula $Mg_3[Si_4O_{10}(OH)_2]$, for example. Thus, at least most of the solid content is advantageously formed by the mineral substance talcum, wherein this substance may be used in powder form, for example, and/or it may be present in the support material in the form of particles. In all cases, the solid material may consist of a powdery solid.

It may be advantageous if the specific surface density determined according to BET, ISO 4652 of the talcum particles is in a range from ≥4 $m^2/g$ to ≤8 $m^2/g$, for example in a range from ≥5 $m^2/g$ to ≤7 $m^2/g$.

It may further be advantageous if the talcum is present with a bulk density according to DIN 53468 in a range from ≥0.15 $g/cm^3$ to ≤0.45 $g/cm^3$, for example in a range from ≥0.25 $g/cm^3$ to ≤0.35 $g/cm^3$.

With reference to the material which forms the B layer, it may further be provided that the thermoplastic resin material and filler material together are present in a total quantity from ≥95 wt %, in particular ≥99 wt %, relative to material that constitutes the B layer. In other words, it may be provided that additional substances other than the thermoplastic material and the filler material are only present in the material forming the B layer in a proportion of <5 wt %, preferably <1 wt % relative to the material constituting the B layer. Thus, it may be advantageous that the material constituting the B layer consists mostly of thermoplastic resin and one or more filler materials.

It may further be provided that thermoplastic resin material of the B layer includes further constituents such as flexibilisers, pigments, stabilisers, impact resistance modifiers, crosslinking and/or dispersant additives.

If pigments are provided as further constituents, it is advantageous if the colour pigments do not contain any lead and/or cadmium. Colour pigments used may include for example copper phthalocyanine, quinacridone and/or diketopyrrolopyrrole. This makes it possible to ensure that the support material can be recycled in an environmentally compatible manner.

According to one variant of the disclosure, the recycled PET (rPET) may have a Vicat softening temperature between ≥70° C. and ≤80° C., for example 75° C.

It may further be provided that the recycled PET (rPET) has a Melting Flow Index (MFI) between ≥40 g/10 min and ≤60 g/10 min, for example 49 g/10 min.

It may further be provided that the dimensional stability under heat (method A: 1.82 MPa) of the rPET is in a range between ≥63° C. and ≤83° C., for example at 73° C.

According to one variant of the disclosure, the rPET may have a tensile strength between ≥50 MPa and ≤70 MPa, of 60 MPa for example.

According to one variant of the disclosure, the rPET may have a tensile modulus in a range from ≥1500 MPa to ≤2500 MPa, of 2000 MPa for example.

Moreover, the elongation at rupture of the rPET according to one variant of the disclosure may be in a range between ≥7.0% and ≤12.0%, 9.2% for example.

According to one variant of the disclosure, the rPET may reach a Charpy impact resistance in a range between ≥20 $kJ/m^2$ and ≤40 $KJ/m^2$, for example 30 $KJ/m^2$.

According to a further variant of the disclosure, if the material of the B layer includes a mixture of recycled PET and talcum, it may have a Vicat softening temperature in a range between ≥70° C. and ≤90° C., for example 83° C. According to a further variant, the dimensional stability under heat (A-1.82 MPa) of such a material may be in a range between ≥70° C. and ≤90° C., 80° C. for example. According to a further variant, the tensile strength of such a material may be in a range between ≥35 MPa and ≤55 MPa, such as 45 MPa for example. According to a further variant, the tensile modulus of such a material may be in a range between ≥1800 MPa and ≤2500 MPa, 2100 MPa for example. According to a further variant, the elongation at rupture of such a material may be in a range between ≥2% and ≤10%, and may be 4% for example. According to a further variant, the Charpy impact resistance of such a material may be in a range between ≥5 $KJ/m^2$ and ≤20 $KJ/m^2$, for example 10 $KJ/m^2$.

According to the disclosure, it may further be provided that different A-B-A film layers are arranged one on top of the other, which layers may be identical with regard to the thermoplastic resin of type A, but differ in construction of the B layer, for example. Accordingly, it may be provided for example that a central film of the A-B-A type is provided within the film stack, in which the B layer has a high proportion of a filler material, for example 50 wt % relative to the total weight of the B layer, whereas the A-B-A film layers arranged above and/or below this A-B-A film layer have a lower proportion of filler material in the B layer, for example 15 wt % relative to the total weight of the B layer.

It may also be provided that the A-B-A film layers stacked one on top of the other differ in the nature of their filler material. Accordingly, it may be provided for example, that one A-B-A film layer contains a filler material such as talcum, and another A-B-A film layer contains inorganic foams, cellulose and/or an expanding agent as filler material, and that in this way the layers of type B differ in terms of their physicochemical properties such as density, thermal capacity or hardness.

The provision of different variants of the B layers makes it possible to vary the overall properties of the multi-laminate plastic support material according to the disclosure over a broad range and to adapt the material to the desired property of a product manufactured from said support material, e.g. a decorative panel.

According to a further variant of the disclosure, it may be provided that the thermoplastic resin of the A layer contains a glycol-modified polyethylene terephthalate (PET-G). Surprisingly, it has been found that the glycol-modified PET can function as a sealing and/or adhesive layer between the A-B-A multilayer composites, and thereby significantly enhances reliable bonding of the multilayer composites with each other.

According to a variant of the disclosure, the PET-G may have a Vicat softening temperature in a range between ≥63° C. and ≤83° C., 73° C. for example. According to a variant of the disclosure, the dimensional stability under heat (A-1.82 MPa) may have a value in a range between ≥59° C. and ≤79° C., for example 69° C. According to a further variant of the disclosure, the value of the tensile strength of the PET-G may be in a range between ≥40 MPa and ≤60 MPa, for example 50 MPa. It may be provided that the tensile modulus is in a range between ≥1800 MPa and ≤2300 MPa, for example 2010 MPa. According to a further variant of the disclosure, it may be provided that the elongation at rupture of the PET-G is in a range between ≥100% and ≤150%, for example 130%. According to a further variant of the disclosure, the Charpy impact resistance of a PET-G may be in a range between ≥150 KJ/m$^2$ and ≤250 KJ/m$^2$, for example 190 KJ/m$^2$.

According to a preferred variant of the disclosure, the proportion of glycol-modified polyethylene terephthalate relative to the thermoplastic resin of the A layer is in a range between ≥2 wt % and ≤10 wt %.

It may further be provided that the thermoplastic resin material of the A layer includes further constituents such as flexibilisers, pigments, stabilisers, impact resistance modifiers, crosslinking agents and/or dispersant additives.

According to the disclosure, it may be provided that the layer thickness of the B layer is between ≥100% and ≤3000% of the layer thickness of the A layer. In other words, the B layer may have the same layer thickness as an A layer or it may be up to 30 times thicker than said A layer. In particular, it may be provided that largest part of the total layer thickness of the multilayer composite A-B-A is provided by the B layer. Accordingly, it may be provided for example that the layer thickness of the B layer constitutes ≥50% of the total layer thickness of the multilayer composite, preferably ≥60%, particularly ≥70% and more preferably ≥90% of the total layer thickness.

Surprisingly, it was found, that the provision of even thin A layers is sufficient to bond the multilayer composites A-B-A to each other in such manner that an extremely stable multi-laminate plastic support material can be produced, the macroscopic properties of which are defined substantially by the properties of the B layer.

According to one variant of the disclosure, a multilayer composite A-B-A may have a Vicat softening temperature in a range between ≥63° C. and ≤83° C., for example 73° C.

According to one embodiment of the disclosure, the molten mass of a multilayer composite A-B-A may have a Melt Flow Index MFI in a range from ≥130 g/10 min to ≤190 g/10 min, for example 160 g/10 min.

According to a variant of the disclosure, the dimensional stability under heat (A-1.82 MPa) of a multilayer composite may be in a range between ≥55° C. and ≤85° C., for example 70° C.

According to a further variant of the disclosure, a multilayer composite A-B-A may have a tensile strength in a range between ≥63 MPa and ≤83 MPa, for example 73 MPa. According to a variant of the disclosure, the tensile modulus of a multilayer composite A-B-A may be in a range between ≥3200 MPa and ≤3900 MPa, for example 3680 MPa.

According to one embodiment of the disclosure, a multilayer composite A-B-A may have an elongation at rupture in a range between 2.5% and 3.5%, for example 3.1%.

According to a preferred variant of the disclosure, the multi-laminate plastic support material according to the disclosure has a shrinkage of ≤0.25% at 80° C. according to ISO 23999.

The disclosure also relates to a method for producing a multi-laminate plastic support material including the steps:

a) Producing a first film-like multilayer composite with the layer sequence A-B-A, wherein the A layer includes a first thermoplastic resin and the B layer includes a second thermoplastic resin;

b) Placing a plurality N of first film-like multilayer composites with the layer sequence A-B-A one on top of the other to form a layer stack, wherein 250≥N≥2, preferably 200≥N≥3, more preferably 125≥N≥4, most preferably 100≥N≥5;

c) Compressing the layer stack using the effects of pressure and temperature; and d) Cooling the compressed layer stack.

Surprisingly, it was found that a multi-laminate plastic support material according to the disclosure may be produced easily by means of the method according to the disclosure by first producing a film with the layer sequence A-B-A by feeding the first and second thermoplastic resins into a feedblock and extruding the thermoplastic resin through a sheet extrusion die. The film obtained in this way may then be arranged in a stack, each of the layers of type A being arranged to face each other. The film stack obtained thereby may then be bonded together using the effects of pressure and temperature to form a corresponding multi-laminate support material, wherein the layers of type A assure the material bond between the individual A-B-A film layers.

It is particularly advantageous in this context that the target layer thickness of the multi-laminate plastic support material may be adjusted easily by varying the number of A-B-A film layers which are placed one on top of the other and bonded with each other.

At the same time, it is also possible to superpose different A-B-A film layers which, although identical in respect of the nature of the type A thermoplastic resin, are however different for example in terms of the structure of the B layer.

According to one variant of the disclosure, it may be provided in particular that the first thermoplastic resin of the film-like multilayer composite having the layer sequence A-B-A is a virgin plastic, and the second plastic is a recycled plastic.

It is envisaged that the process for production of the multi-laminate plastic support material according to the disclosure is divided into two stages. In the first, the A-B-A three-layer film is produced by co-extrusion via a feedblock and sheet extrusion die. In the second step, multiple films are laminated to form a board using the effects of pressure and temperature, by means of a dual-band press for example.

In order to manufacture the three-layer film with the layer sequence A-B-A, a co-extrusion method may be used. This process may make use of two co-rotating twin-screw extruders for example. A main extruder may be used to produce the material for the middle layer B, and it may be provided that this extruder has two lateral feeds. These lateral feeds may be used for mixing filler materials.

The second twin-screw extruder may be used to produce the thermoplastic resin for two A-type layers. This extruder may also be equipped with lateral feeds to enable mixing of additional constituents.

In order to be able to remove any moisture and/or monomers from the polyester melt in the extruder, provision may be made to install a high-vacuum venting system in both twin-screw extruders.

The polymer melts from both extruders may be introduced into a feedblock separately from one another. While the melt from the main extruder forms the type B middle layer, the material from the co-extruder is directed above and below the middle layer and forms the two type A outer layers. The three-layer melt may then be passed through a sheet extrusion die. This die serves to create a uniform layer distribution over the entire intended film width.

A number of different variants may be implemented for the cooling process which is carried out subsequently. For example, the melt may be cooled by means of a calender roller system. A chill roll may also be used. In this context, an air knife and a vacuum chamber may fulfil the function of ensuring that the melt lies evenly on the chill roll. Such a method is known from the production of cast films, for example.

According to a further variant of the disclosure, it may be provided that at least a part of the film-like multilayer composite with the A-B-A layer sequence is stretched biaxially before being placed one on top of the other to form the layer stack. For the purposes of the disclosure, biaxial stretching is understood to mean that the film-like multilayer composites with the A-B-A layer sequence obtained are stretched in two directions orientated substantially orthogonally to one another, thus they are stretched longitudinally and transversely. In this way, it is possible to obtain the desired film thickness and reduce the grammage, and improve the mechanical properties, e.g., strength characteristics, increase transparency, improve cold resistance, and reduce the gas permeability of the film layer. In particular, biaxial stretching of the films with the A-B-A layer sequence has the effect of increasing their tensile strength, which directly affects the mechanical properties of the multi-laminate plastic support material which as finally produced.

In this context, the biaxial stretching may be carried out either sequentially, first in a first direction and then in a second direction, or simultaneously, in both directions at the same time, simultaneous stretching being preferred.

Before the film-like multilayer composites with the A-B-A layer sequence are stacked to form a film stack that will be compressed, it may be provided according to the disclosure that the film undergoes corona treatment. It has been found that carrying out a corona treatment helps to create an improved multilayer composite in the eventual multi-laminate plastic support material. In this context, the corona treatment may be carried out immediately after the film is produced and before the films are wound onto a reel, or immediately before the films are stacked to form a corresponding film stack for subsequent compression thereof.

To this extent, the film-like multilayer composite with the layer sequence A-B-A constitutes a semi-finished product which can be stored temporarily. Such a product may be stored preferably at room temperature with atmospheric humidity of 50%. In these conditions, the film-like multilayer composite may be stored indefinitely.

It may also be provided that the film-like multilayer composite with the layer sequence A-B-A is stacked to form a layer stack for compression immediately after it is produced, and the manufacturing process is designed as an in-line manufacturing process.

The three-layer film-like multilayer composites with the layer sequence A-B-A when stacked or positioned one on top of the other above the A-type film layers located on the outside may be laminated to form a continuous board material under the effects of pressure and temperature in a preferably isobaric dual-band press.

The press that is used may have a feed rate of 20 m/min for example.

The three-layer film-like multilayer composites with the layer sequence A-B-A may be fixed on dispensers in a station corresponding to the required board thickness and layer arrangement. For the compressing process, the three-layer film-like multilayer composites with the layer sequence A-B-A may be preheated to temperatures of ≥80 to ≤135° C. for example. Suitable heat sources for this may be for example a heated roller, hot air, an IR radiator, particularly a NIR radiator, or a microwave radiator or a combination thereof.

This is followed by a compression of the film stack, preferably in a dual-band press. The dual-band press may preferably be equipped with steel bands for this.

The compression time may be in a range from ≥0.5 min to ≤20 min, preferably in a range from ≥1 min to ≤50 min, in particular ≤2 min.

The pressure to be applied during the compression may be in a range from ≥0.5 MPa to ≤25 MPa, preferably in a range from ≥1 MPa to ≤15 MPa according to the disclosure.

The target temperature in the core of the film stack may preferably be set in a range between ≥65° C. and ≤140° C., in particular in a range between ≥80° C. and ≤120° C. This ensures a good bond between the individual films.

The finished board or the finished multi-laminate plastic support material may then be cooled preferably evenly to room temperature. This is done for example with the aid of an air-cooled roller in the dual-band press. Afterwards, the product may be cut to size and stacked for storage.

According to a further variant of the disclosure, it may be provided that the film-like multilayer composites with the layer sequence A-B-A are placed orthogonally to each other when stacked in a layer stack. In this context, for the purposes of the disclosure orthogonal positioning is understood to mean that the films are stacked transversely to each other with regard to their production direction, that is to say their longitudinal direction. This arrangement makes it possible to realise a further improvement of the mechanical properties of the final multi-laminate plastic support material. Any longitudinal stresses induced by the production process through the sheet extrusion die and the calendering rollers into the individual film-like layers with the layer sequence A-B-A are compensated by the orthogonal arrangement and result in an anisotropic material.

In this context, it may be provided that the compressing of the film stack takes place in a batch process, wherein the films are aligned orthogonally to each other and are laminated together with each other by means of a press, a multi-platen press for example. Of course, the film-like multilayer composites with the layer sequence A-B-A must be finished to a specific dimension in advance for this.

The compression time may lie within a range from ≥0.5 min to ≤20 min, preferably in a range from ≥1 min to ≤50 min, in particular ≤2 min.

According to the disclosure, the pressure that must be applied during the compression may be in a range from ≥0.5 MPas to ≤25 Mpas, preferably in a range from ≥1 MPas to ≤15 Mpas.

The target temperature in the core of the film stack may preferably be set in a range between ≥65° C. and ≤140° C., in particular in a range between ≥80° C. and ≤120° C. This assures good bonding between the individual films.

The finished board or the finished multi-laminate plastic support material may then be cooled, preferably evenly, to room temperature. This is done with the aid of an air-cooled roller in the dual-band press, for example. Afterwards the product may optionally be further cut to size and stored in stacks.

The disclosure also relates to decorative panels with a core which has a multi-laminate plastic support material according to the disclosure. Such a decorative panel may include a support board or a core made from a corresponding multi-laminate plastic support material, a decoration arranged on the support board, and a cover layer arranged above the decoration. Accordingly, reference is made to the preceding description with regard to the specific features of the core.

The edge areas of the panel may also be structured or profiled, in particular to enable the provision of detachable connecting elements. In this regard, in the case of a profiling, it may be provided within the meaning of the disclosure that a decorative and/or functional profile is worked into at least some of the edges of the decorative panel with the aid of suitable material removing tools. In this context, a functional profile is understood to be for example the creation of a groove and/or tongue profile in one edge to design decorative panels so as to be connectable with each other by means of the profilings created. Particularly in the case of groove and/or tongue profiles, elastic materials are advantageous, since it is only with such materials that profiles of such kind can be created, which are particularly easily manageable and stable. Thus in particular no further materials are needed to create the connecting elements. The multi-laminate plastic support material may enable the creation of panels with a connection strength according to ISO 24334 of ≥2.0 kN/m, preferably ≥4.0 kN/m, in the longitudinal direction and ≥2.5 kN/m, preferably ≥4.5 kN/m in the transverse direction for a joint opening of 0.2 mm.

According to a further variant of the disclosure, it may be provided that following the compression step the multi-laminate plastic support material may undergo a tempering step or a heat treatment step. The effect of this is to advantageously reduce the shrinkage of the multi-laminate plastic support material considerably. In particular, with this step it may be possible to reduce the shrinkage of the multi-laminate plastic support material to a value of ≤0.25% at 80° C. for 6 h according to ISO 23999. Within the meaning of the disclosure, a tempering process is understood to mean that the compressed multi-laminate plastic support material is cooled to a temperature ≤45° C., preferably ≤40° C., in particular ≤35° C. and then heated to a temperature above the glass transition temperature $T_G$ of the plastic in the plastic support material. Accordingly, the multi-laminate plastic support material is heated to a temperature in a range between ≥90° C. and ≤110° C. According to a variant of the disclosure, the multi-laminate plastic support material is heated to a temperature above the glass transition temperature of the plastic, in particular to a temperature in a range between ≥90° C. and ≤110° C., for a period from 0.5 to 5 minutes, preferably 1 to 4 minutes, in particular 1.5 to 3 minutes.

The heating as part of the previously described tempering process may be carried out for example with the aid of IR radiators, particularly NIR radiators (Near Infrared Radiator), microwave radiation or combinations thereof, wherein it may be provided in particular that a radiation of the multi-laminate plastic support material is carried out with corresponding radiators from above and from below, preferably at the same time.

The optional tempering step may be carried out at any point following the compression of the film stack in step c).

For the final production of a decorative panel using a multi-laminate plastic support material according to the present disclosure, the following further production steps may be provided:

e) optionally applying a decorative substrate to at least a partial area of the support;
f) optionally applying a decoration simulating the decorative template to at least a partial area of the support, and
g) optionally applying a protective layer to at least a partial area of the decoration.

The following steps may also be carried out in addition:
h) Structuring the protective layer, and
i) Treating the support for electrostatic discharge and optionally for electrostatic charging before at least one of the abovementioned process steps.

Surprisingly, it was found that with the method described in the preceding text it is possible to enable a particularly advantageous production particularly of a support for a wall or floor panel. Moreover, the method may be particularly advantageous due to a use of the support material as is described in detail in the preceding text.

In order to produce a finished panel, the method may comprise the following method steps for the purpose of furnishing the support with a decoration and coating said decoration with a protective layer. In this context, the following steps are preferably performed immediately with the manufactured web-like support or core. However, the scope of the disclosure also extends to the situation in which the web-like support or core is first divided into a multiplicity of board-like supports before one of the suitable method steps e) to g), and/or the board-like support undergoes further treatment in the correspondingly subsequent method steps. The following notes apply correspondingly for both alternatives, although for the sake of simplicity in the following text said alternatives are referred to as treatment of the support.

A pretreatment of the support for electrostatic discharge and optionally subsequent electrostatic charging may further be carried out optionally initially before method step f). This may in particular serve to avoid the occurrence of blurring while the decoration is being applied.

According to method step e), a decorative substrate may also be applied optionally to at least a partial area of the support. For example, a primer may first be applied in a thickness from ≥10 μm to ≤60 μm as a decorative substrate, particularly for printing processes. In this context, a liquid, radiation-curable mixture based on a urethane or a urethane acrylate, optionally with one or more of a photoinitiator, a reactive diluent, a UV stabiliser, a rheological agent such as a thickener, radical scavenger, flow control agent, defoaming agent or preserving agent, pigment and/or a dye may be used as the primer.

Besides the use of a primer it is possible to apply the decoration to a decorative paper on which a corresponding decoration may be printed, and which may be provided perhaps by means of a resin layer applied to the support previously as a binding agent. Such a printing substrate is suitable not only for flexographic printing, offset printing or silkscreen printing but also in particular for digital printing techniques, such as inkjet processes or laser printing processes. In order to apply the resin layer, it may preferably be provided that a resin composition is applied which contains as the resin component at least one compound selected from the group consisting of melamine resin, formaldehyde resin, urea resin, phenolic resin, epoxy resin, unsaturated polyester resin, diallyl phthalate or mixtures thereof. In such case, the resin composition may be applied for example in an application quantity between $\geq 5$ g/m$^2$ and $\leq 40$ g/m$^2$, preferably $\geq 10$ g/m$^2$ and $\leq 30$ g/m$^2$. In addition, a papier or a nonwoven with a grammage between $\geq 30$ g/m$^2$ and $\leq 80$ g/m$^2$, preferably between $\geq 40$ g/m$^2$ and $\leq 70$ g/m$^2$ is applied to the board-like support.

It may further be provided that the decoration is applied to the support with the aid of a partially or fully printed decorative film or foil. A plastic film printed with a decoration and having a thermoplastic resin base, such as polyethylene terephthalate, polyethylene, polypropylene, polystyrene or polyvinyl chloride, for example, may serve as the decorative film or foil. The thermoplastic resin is preferably one that has good adhesion characteristics to the material of the A layer, so that the decorative film can be thermally fixed or laminated on the support without the need to apply an adhesive layer.

Alternatively, it may be provided that a decorative film is applied to support material according to the disclosure and fixed thereon with the aid of a coating, in particular with the aid of a radiation-curable coating.

Further according to method step f), a decoration simulating a decorative template may be applied to at least a partial area of the support. In this case, the decoration may be applied by "direct printing". For the purposes of the disclosure, the term "direct printing" is understood to mean the application of a decoration directly to the support of a panel, or to a fibre material layer or decorative substrate which is attached to the support but not printed. Various printing techniques, for example flexographic printing, offset printing or silkscreen printing may be employed. In particular, inkjet processes or laser printing processes for example may be used as digital printing techniques.

The decorative layers may also be formed from a dye and/or ink which in particular is radiation-curable. For example, a UV-curable dye or ink may be used.

The decorative layers may each be applied with a thickness in a range from $\geq 5$ µm to $\leq 10$ µm.

Besides an image of the decorative template which is positive with regard to colour and/or structure, it may further be provided to apply a corresponding negative image of the decorative template. In detail, as is known for example from positive staining and negative staining for wood materials for example, the colour impression of a grain for example may be reversed by the use of digital data, with the result that a negative is created with regard to the colour and in particular lighter and darker regions. Besides the colour impression, a similar result is also possible for the structure applied, so that a negative can be created with regard to the structural variant. Effects of such kind can also be integrated in a production process on the basis of digital three-dimensional data easily and without lead time or conversion.

According to method step g), an application of a protective layer to at least a partial area of the decoration may be provided. A layer of such kind for protection of the applied decoration may be applied for protection of the applied decoration in a subsequent method step for protection of the applied decoration, in particular to protect the decorative layer from wear or damage due to dirt, the effects of moisture or mechanical effects such as abrasion, for example. It may be provided for example that the wear and/or cover layer is applied over the printed support as a prefabricated overlay layer, possibly based on melamine, and is bonded therewith by the effects of pressure and/or heat. It may further be preferred that a radiation-curable composition, such as for example a radiation-curable coating like an acrylic coating is also applied to form the wear and/or cover layer. It may then be provided that the wear layer includes hard substances such as for example titanium nitride, titanium carbide, silicon nitride, silicon carbide, boron carbide, tungsten carbide, tantalum carbide, aluminium oxide (corundum), zirconium oxide or mixtures thereof to increase the layer's wear resistance. The application may be carried out for example using rollers, with rubber rollers or by means of pouring apparatuses.

The cover layer may also be partially cured initially and a final coating with a urethane acrylate and final curing with a gallium radiator for example may be carried out subsequently.

The cover and/or wear layer may further contain means for reducing static (electrostatic) charging of the final laminate. For this purpose, it may be provided for example that the cover and/or wear layer contains compounds such as choline chloride. The antistatic agent may be present in the cover layer and/or composition for forming a wear layer for example in a concentration between $\geq 0.1$ wt % and $\leq 40.0$ wt %, preferably between $\geq 1.0$ wt % and $\leq 30.0$ wt %.

It may further be provided that a structuring, in particular a surface structuring matching the decoration is worked into the protective layer or the wear or cover layer by the introduction of pores. In this context, it may be provided that the support board already has a structuring and a printing tool for application of the decoration and the support board are aligned with each other depending on the structuring of the support board which is captured by optical processes. For aligning the printing tool and the support board with each other, it may be provided that a relative movement between the printing tool and the support board with respect to each other required for the alignment is caused by a displacement of the support board or a displacement of the printing tool. It may further be provided that a structuring of the decorative panels takes place after the cover and/or wear layer has been applied. To this end, it may preferably be provided that a curable composition is applied as a cover and/or wear layer and a curing process is carried out only to the extent that a partial curing of the cover and/or wear layer takes place. Suitable tools such as a hard metal texture roller or a stamp impress a desired surface structure in the layer which has been partially cured in this way. The impression is carried out in accordance with the applied decoration. In order to guarantee sufficient agreement between the structure to be created and the decoration, it may be provided that the support board and the stamping tool are aligned with each other by corresponding relative movements. After the desired structure has been introduced into the partially cured cover and/or wear layer, a further curing of the now structured cover and/or wear layer is carried out.

In this context, it may also be provided that a structuring of the surface is created by means of a process for producing a structure on a surface in which a liquid base layer is first applied to the surface of the workpiece and then a multiplicity of droplets are sprayed into the still liquid base layer in such manner that the layer thickness of the base layer is altered at the sites where the droplets land. In this way, depressions are created in the previously applied liquid base layer by the spraying of the droplets. Finally, the liquid base layer is fixed. This may be carried out by heat or by electromagnetic radiation depending on the material of the base layer.

Additionally, a reverse image may be applied to the side opposite the decoration side.

According to variant of the disclosure, the tempering step described earlier may be carried out in particular after the previously described process step g) or h). In particular, it may be provided that a board with a plastic support material according to the disclosure which is obtained upon completion of step g) or h) and then decorated is first divided into areas to receive individual decorated panels, which then undergo a profiling of at least two of the panel edges to form complementary locking means, by which panels may be connected to each other. A tempering step may then be performed preferably only after the panel has been divided up and or received the profiling. The provision of a tempering step for a panel that has been previously profiled is a particularly preferred variant.

DRAWINGS

The drawings described herein are for illustrative purposes only of selected embodiments and not all possible implementations, and are not intended to limit the scope of the present disclosure.

In the following text, the disclosure will be explained further with reference to the figures and an exemplary embodiment.

Figure 2:
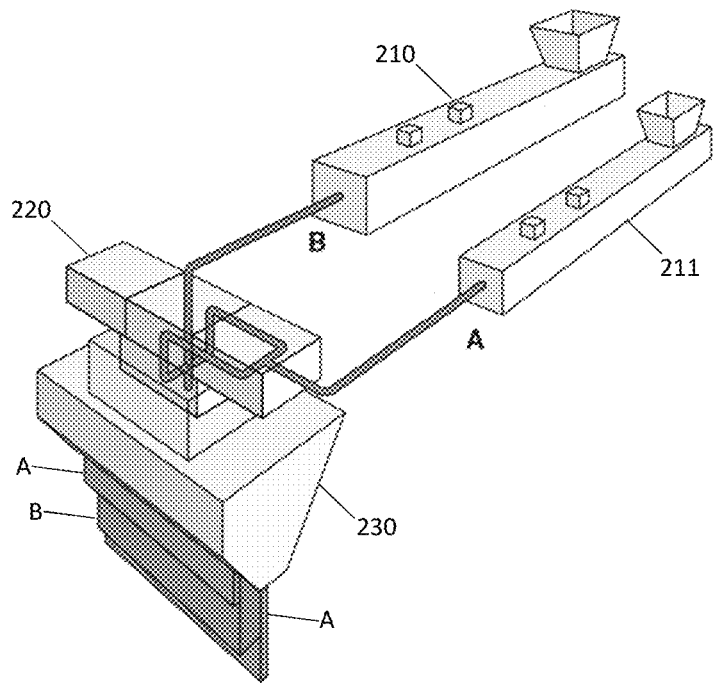

FIG. 1 shows a schematic representation of a variant of a multi-laminate plastic support material according to the disclosure; and FIG. 2 illustrates the method workflow for producing a film-like multilayer composite with the layer sequence A-B-A for a multi-laminate plastic support material according to the disclosure.

Corresponding reference numerals indicate corresponding parts throughout the several views of the drawings.

DETAILED DESCRIPTION

Example embodiments will now be described more fully with reference to the accompanying drawings.

FIG. 1 shows a schematic representation of a variant of a multi-laminate plastic support material 100 according to the disclosure. The multi-laminate plastic support material 100 includes a plurality N of A-B-A layer sequences 110. In the schematic embodiment shown, the number of A-B-A layer sequences is 4 (N=4). In general, the number of A-B-A layer sequences 110 may be between 3 and 250 (250≥N≥2). The A layer includes a first thermoplastic resin and the B layer includes a second thermoplastic resin. The first thermoplastic resin is preferably a virgin plastic and the second plastic a recycled plastic. The thermoplastic resins are preferably polyethylene terephthalates. These are available in large quantities particularly as recycled material from the recycling of food packaging. The thermoplastic resin of the A layer is preferably a glycol-modified polyethylene terephthalate (PET-G). Surprisingly, it was found that the glycol-modified PET can function as a sealing and/or adhesive layer between the A-B-A multilayer composites. The A-B-A layer sequence 110 may have a total layer thickness between 100 μm and 2000 μm. In this case, it may be provided that the layer thickness of the B layer has a value between ≥100% and ≤3000% of the layer thickness of the A layer. In other words, the B layer may have the same layer thickness as an A layer or it may be up to 30 times thicker than said B layer. In particular, it may be provided that largest part of the total layer thickness of the multilayer composite A-B-A is provided by the B layer. Accordingly, it may be provided for example that the layer thickness of the B layer constitutes ≥50% of the total layer thickness of the multilayer composite, preferably ≥60%, particularly ≥70% and more preferably ≥90% of the total layer thickness. The thermoplastic resin of the B layer may preferably be a plastic that is modified with filler materials, such as talcum for example, in particular a PET. The multi-laminate plastic support material 100 according to the disclosure may be made into a film stack 120 by stacking film-like multilayer composites 110 one on top of the other, wherein the stack is then compressed together under the effects of pressure and temperature. The pressure to supply during the compression according to the disclosure may be in a range from ≥0.5 MPa to ≤25 MPa, preferably in a range from ≥1 MPa to ≤15 MPa. The target temperature in the core of the film stack may preferably be set in a range between ≥65° C. and ≤140° C., in particular in a range between ≥80° C. and ≤120° C. This ensures good bonding between the individual three-layer film-like multilayer composites 110. For the compression process, a preheating of the three-layer film-like multilayer composites 110 may be provided to ≥80 to ≤135° C. for example. Suitable heat sources for this may be for example a heated roller, hot air, an IR radiator, in particular an NIR radiator or a microwave radiator or combination of these. The compression may take place for example in a dual-band press, so that and endless material is produced in a continuous process. It may be provided that the exposed surfaces of the A layer are pre-treated with a corona treatment before the film-like multilayer composites 110 are stacked to form the film stack 120. After the compression of the film stack 120 to form the multi-laminate plastic support material according to the disclosure, it can be cooled down and cut to the desired size.

FIG. 2 illustrates the method workflow for producing a film-like multilayer composite with the layer sequence A-B-A for a multi-laminate plastic support material according to the disclosure. According to the disclosure, it may be provided that a film-like multilayer composite with the layer sequence A-B-A is produced by co-extrusion using a feedblock 220 and sheet extrusion die 230. This process may make use of two co-rotating twin-screw extruders 210, 211 for example. A main extruder 210 may be used to produce the material for the middle layer B, and it may be provided that this extruder has two lateral feeds. These lateral feeds may be used for mixing filler materials. The second twin-screw extruder 211 may be used to produce the thermoplastic resin for two A-type layers. This extruder may also be equipped with lateral feeds to enable mixing of additional constituents. In order to be able to remove any moisture and/or monomers from the polyester melts in the extruder, provision may be made to install a high-vacuum venting system in both twin-screw extruders. The polymer melts from both extruders 210, 211 may be introduced into a feedblock 220 separately from one another. While the melt from the main extruder 210 forms the type B middle layer, the material from the co-extruder 211 is directed above and below the middle layer B and forms the two type A outer layers. The three-layer melt may then be passed through a sheet extrusion die 230. This die serves to create a uniform layer distribution over the entire intended film width. A number of different variants may be implemented for the cooling process which is carried out subsequently. For example, the melt may be cooled by means of a calender roller system. A chill roll may also be used. In this context, an air knife and a vacuum chamber may fulfil the function of ensuring that the melt lies evenly on the chill roll.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A multi-laminate plastic support material having a plurality N of A-B-A layer sequences, wherein the A layer includes a first thermoplastic resin and the B layer includes a second thermoplastic resin, and wherein the first thermoplastic resin is a virgin plastic and the second plastic is a recycled plastic, and wherein $250 \geq N \geq 2$, wherein the B layer includes a filler material besides the thermoplastic resin, wherein the filler material is preferably selected from the group consisting of chalk, non-asbestos silicate, preferably magnesium silicate, sawdust, expanded clay, volcanic ash, pumice, aerated concrete, in particular includes inorganic foams, cellulose or an expanding agent, and wherein the proportion of filler material is in a range between $\geq 1$ wt % and $\leq 60$ wt % relative to the total weight of the material that forms the B layer.

2. The multi-laminate plastic support material according to claim 1, wherein the recycled thermoplastic resin of the B layer includes an amorphous polyethylene terephthalate (PET).

3. The multi-laminate plastic support material according to claim 1, wherein the thermoplastic resin of the A layer includes a glycol-modified polyethylene terephthalate (PET-G).

4. The multi-laminate plastic support material according to claim 1, wherein the layer thickness of the B layer has a value between 100% and 3000% of the layer thickness of the A layer.

5. The multi-laminate plastic support material according to claim 1, wherein the plastic support material has a shrinkage of $\leq 0.25\%$ at 80° C. according to ISO 23999.

6. The multi-laminate plastic support material according to claim 1, wherein at least a part of the film-like multilayer composites with the layer sequence A-B-A is stretched biaxial.

* * * * *